United States Patent [19]
Botti et al.

[11] Patent Number: 5,796,567
[45] Date of Patent: Aug. 18, 1998

[54] ELECTRONIC CIRCUIT WITH PROTECTION AGAINST SUPPLY VOLTAGE OVERLOAD

[75] Inventors: Edoardo Botti; Tiziana Mandrini, both of Pavia, Italy

[73] Assignee: SGS-Thomson Microelectronics S.r.l., Agrate-Brianza, Italy

[21] Appl. No.: 581,445

[22] Filed: Dec. 29, 1995

[30] Foreign Application Priority Data

Dec. 30, 1994 [EP] European Pat. Off. .............. 94830596

[51] Int. Cl.$^6$ ...................................................... H02H 3/20
[52] U.S. Cl. ................................. 361/91; 361/58
[58] Field of Search .......................... 361/18, 56, 58, 361/88, 91, 111, 119; 327/143, 434; 323/274, 311, 312

[56] References Cited

U.S. PATENT DOCUMENTS 5,418,674 5/1995 Davies et al. ...................... 361/18
5,463,521 10/1995 Love ................................... 361/58

FOREIGN PATENT DOCUMENTS 0019864 12/1980 European Pat. Off. .......... H02H 3/20
41 10 495 10/1992 Germany ......................... H02H 3/20

*Primary Examiner*—Ronald W. Leja
*Attorney, Agent, or Firm*—David V. Carlson; Seed and Berry LLP

[57] ABSTRACT

A semiconductor electronic circuit with a protection device against supply voltage overloading, being of the type which comprises a first power circuit portion connected to a power supply line and enabled through at least a first transistor.

This transistor has a control terminal driven by a voltage sensor connected to the power supply line. The semiconductor electronic circuit is characterized, moreover, in that it comprises a second signal circuit portion connected to the power supply line in a structurally independent manner of the first power circuit portion and through a controlled switch.

2 Claims, 3 Drawing Sheets

/ 2

ELECTRONIC CIRCUIT WITH PROTECTION AGAINST SUPPLY VOLTAGE OVERLOAD

TECHNICAL FIELD

This invention relates to semiconductor electronic circuits, and in particular to a semiconductor electronic circuit provided with a protection device against supply voltage overloading.

The present invention is particularly related to the automotive industry, and this description will cover a semiconductor electronic circuit provided with a protection device against supply voltage overloading for the purpose of simplifying its illustration.

BACKGROUND OF THE INVENTION

As is well known, semiconductor electronic circuits installed in motor vehicles need to be protected against high voltage pulses or transients much in excess of the supply voltage normally applied to them from the vehicle's own battery.

These supply voltage pulses can be quite high and are commonly referred to as "dump" voltages.

They become manifest especially as the connection between the vehicle battery and the motor is opened while the motor is running. Under such circumstances, the battery-charging alternator can generate voltage pulses.

It should be pointed out that during the time period when these voltage pulses are generated, operation of the electronic circuits should be stopped, and thereafter resumed as soon as the pulses cease to be generated.

The electronic circuits installed in motor vehicles are customarily provided with protection devices to prevent their destruction on the occurrence of such voltage pulses.

An electronic circuit equipped with a protection device of this kind which embodies the prior art is shown in FIG. 1.

With reference to FIG. 1, an electronic circuit 1 comprises a protection device 5 incorporating a voltage sensor (R1, R2, Z1) connected between a power supply line AL and a fixed voltage reference GND.

In particular, this voltage sensor (R1, R2, Z1) comprises first R1 and second R2 resistive elements connected in series with each other, respectively between the power supply line AL and a first terminal of a zener diode Z1. The zener diode Z1, in turn, has a second terminal connected to the fixed voltage reference GND.

Also with reference to FIG. 1, the protection device 5 comprises a transistor Q1 of the PNP type, for example, having a control terminal connected to a first circuit node A interconnecting the first R1 and second R2 resistive elements.

The transistor Q1 also has a first terminal connected to the supply line AL and a second terminal for enabling protection means (not shown) included in a circuit portion 4 connected to the same supply line AL.

This circuit portion 4 comprises both power and signal elements incorporated in the electronic circuit 1.

The electronic circuit 1 operates as follows.

With normal supply voltages Vcc, the transistor Q1 is cut off. Under this condition, if the supply voltage Vcc increases, the voltage across the first resistive element R1 also increases.

As the supply voltage Vcc exceeds a given threshold value, the transistor Q1 changes from a cut off state to a conduction state, thereby enabling the protection means arranged within the circuit portion 4 to prevent destruction of the electronic circuit 1.

Specifically, such protection means will be operative within the circuit portion 4:

1) to turn off all the current generators;
2) to connect the base terminals of the bipolar transistors to their emitters, thereby utilizing the fact that the value of the breakdown voltage $V_{cbo}$ of the base-collector junction is greater than the breakdown voltage value $V_{ceo}$ of the collector-emitter junction in the open base terminal condition; the last-mentioned voltage value should be more than the overvoltage value; and
3) to prevent subjecting the MOS transistors to higher gate-source terminal voltages than the values which may result in rupture of the gate oxide. These values are typically on the order of 20 volts. In addition, said MOS transistors should be able to support dump voltages.

The circuit portion 4 should be arranged to have all the components therein which are directly or indirectly connected to the supply voltage Vcc, such as resistors, capacitors, and EPI wells, made with sufficiently large tolerances, i.e. sufficient distances between different diffused regions. Furthermore, these components should be designed for layout rules effective to prevent breakdowns from occurring at the transistor junctions due to Zener effect or current losses from parasitic MOS transistors.

All of the above protective measures, while being essential to avoid destruction of the electronic circuit 1, do bring about an increase in the silicon area occupied by the circuit structure.

In addition, errors become more likely to be introduced due to the large number of rules that these protective measures require.

Therefore, it is desirable to provide a semiconductor electronic circuit equipped with a protection device against supply voltage overloading, which can remedy the problems connected with the practical circuit-wise implementation of the basic protective measures, in order to prevent the circuit from being destroyed.

SUMMARY OF THE INVENTION

According to one embodiment of the present invention, a semiconductor circuit with a protection device for protecting against a supply voltage overload is provided. The semiconductor circuit includes a voltage protection circuit, an electronic circuit having a power circuit portion and a signal circuit portion, and a switch. The voltage protection circuit monitors the supply voltage provided to the electronic circuit and senses an overload of the supply voltage. The power circuit portion includes protection means which receives an enable signal from the voltage protection circuit to protect the power circuit portion when the supply voltage is in an overload condition. The signal circuit portion of the electronic circuit is structurally independent from the power circuit portion and is connected to the voltage protection circuit through the switch. The switch is controlled by the voltage protection circuit and is connected between the supply voltage and the signal circuit portion of the electronic circuit. The switch is used to isolate the signal circuit portion from the supply voltage when the voltage protection circuit senses the overload of the supply voltage. By separating the electronic circuit into the power circuit portion and the signal circuit portion, and having a separate switch for the signal circuit portion, the present invention allows more circuit components to be integrated into the electronic circuit than was previously allowed.

BRIEF DESCRIPTION OF THE DRAWINGS

The features and advantages of the electronic circuit of this invention will be apparent from the following description of an embodiment thereof, given by way of example and not of limitation with reference to the accompanying drawings.

In the drawings.

DETAILED DESCRIPTION OF THE INVENTION

Figure 1:
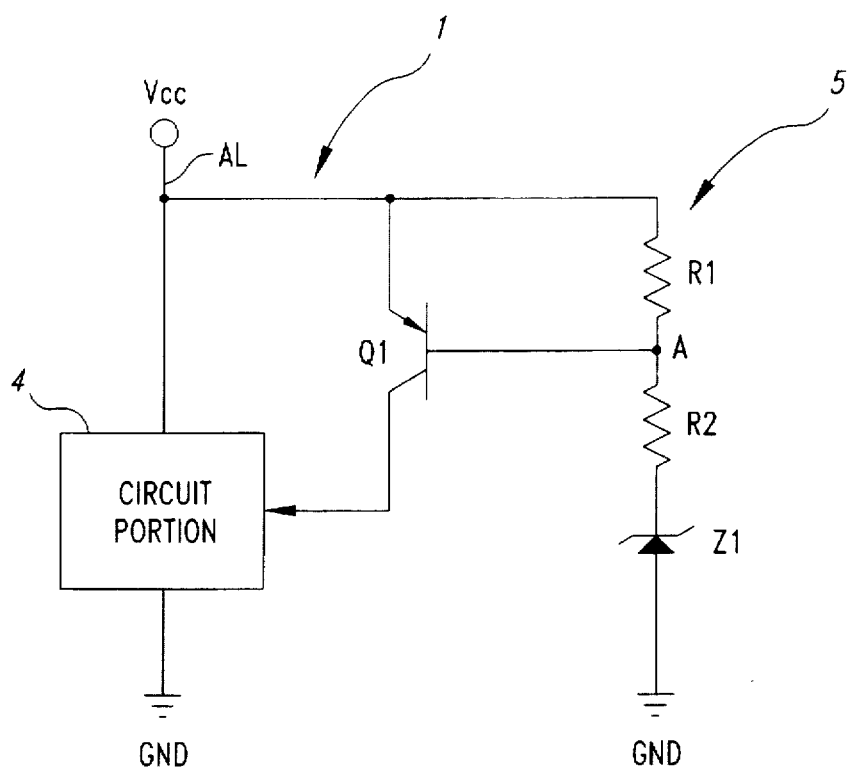
FIG. 1 shows a diagram for a semiconductor electronic circuit provided with a protection device against supply voltage overloading, according to the prior art.

With reference to the drawing figures, generally and schematically indicated at 1 is a semiconductor electronic circuit with a protection device against supply voltage overloading.

Figure 2:
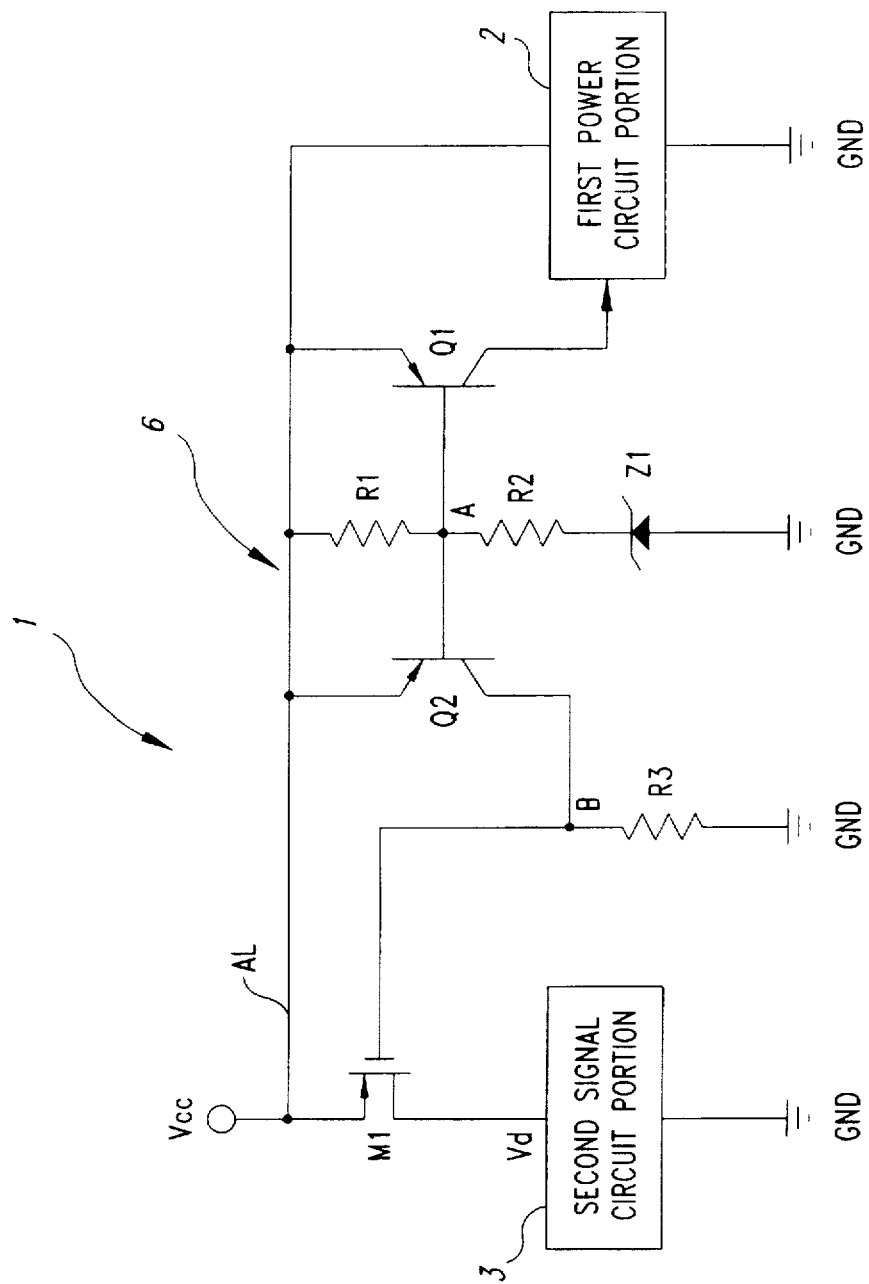
FIG. 2 shows a diagram for a semiconductor electronic circuit with a protection device against supply voltage overloading, according to this invention.

With reference in particular to FIG. 2, the electronic circuit 1 includes a protection device 6 which incorporates a voltage sensor (R1, R2, Z1) connected between a power supply line AL and a fixed voltage reference GND.

More particularly, this sensor comprises first R1 and second R2 resistive elements respectively connected, in series with each other, between the power supply line AL and a first terminal of a zener diode Z1.

The zener diode Z1 is, in turn, provided with a second terminal connected to the fixed voltage reference GND.

Also with reference to FIG. 2, the protection device 6 further comprises a first transistor Q1 of the PNP type, for example, which has a control terminal connected to a first circuit node A interconnecting the first R1 and second R2 resistive elements.

This first transistor Q1 is further provided with a first terminal connected to the power supply line AL and a second terminal for enabling protection means incorporated in a first power circuit portion 2 of the electronic circuit 1 connected to the same power supply line AL.

It can be seen in FIG. 2 that the protection device 6 also comprises a second transistor Q2 of the PNP type, for example, having first and second terminals respectively connected to the power supply line AL and a second circuit node B, and a control terminal connected to the first circuit node A.

The circuit node B is, in turn, coupled to the fixed voltage reference GND through a third resistive element R3.

Again with reference to FIG. 2, it can be seen that the electronic circuit 1 also has a second signal circuit portion 3 connected to the power supply line AL in a structurally independent manner of the first power circuit portion 2.

Specifically, this second signal circuit portion 3 is coupled to the power supply line AL through at least one controlled switch M1 which may be a P-channel MOS transistor, for example.

More specifically, this transistor has first and second terminals respectively connected to the power supply line AL and the signal circuit portion 3, and a control terminal connected to the second circuit node B.

Figure 3:
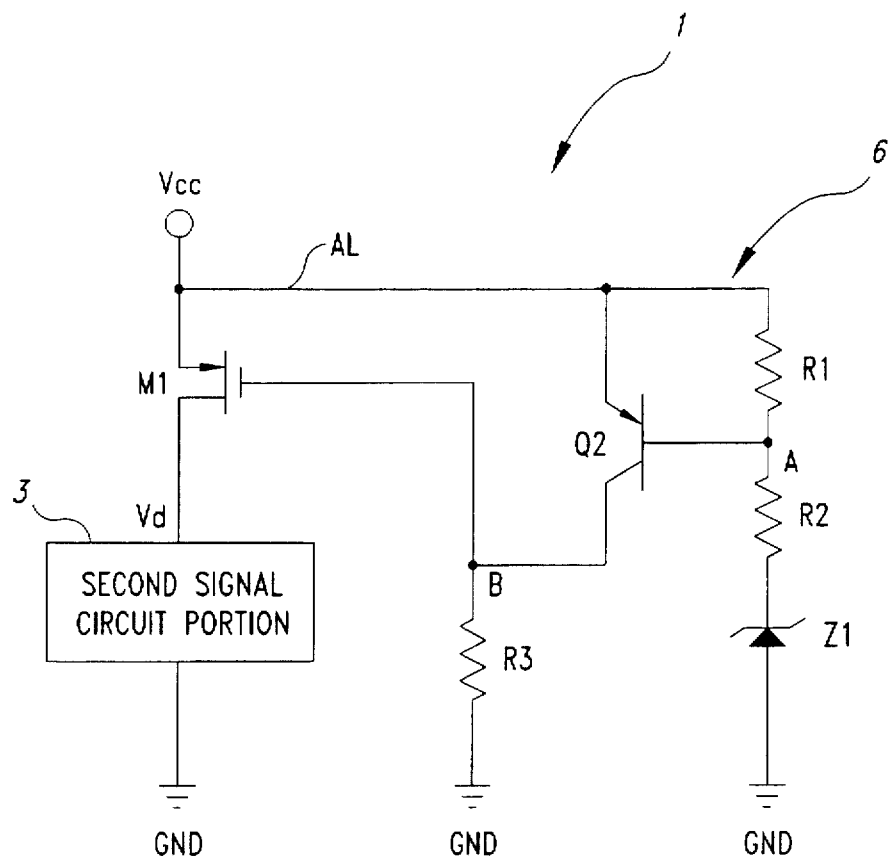
FIG. 3 is a further diagram for a semiconductor electronic circuit with a protection device against supply voltage overloading, according to this invention.

It matters to observe, moreover, that where the electronic circuit 1 only includes the signal circuit portion 3, as shown in FIG. 3, the protection device 6 would not include the first transistor Q1. As in FIG. 2, the electronic circuit 1 of FIG. 3 includes a protection device 6 (R1, R2, Z1, and Q2), switch M1, resistive element R3, and signal circuit portion 3. Thus, the circuit 1 of FIG. 3 is similar to that of FIG. 2. Accordingly, the operation of the circuit 1 of FIG. 3 is clearly evident from the forthcoming description of the operation of the circuit 1 of FIG. 2.

Referring back to FIG. 2, the operation of the electronic circuit 1 of this invention will now be described assuming, in particular, an initial state wherein the first Q1 and second Q2 transistors are cut off, and the controlled switch M1 is closed. Under these conditions, the supply voltage Vcc is present on the first power circuit portion 2, whereas on the second signal circuit portion 3 a voltage Vd is present which is close in value to the supply voltage Vcc.

As the supply voltage Vcc increases, the voltage across the first resistive element R1 will also increase. Upon the supply voltage Vcc exceeding a given threshold level, the first Q1 and second Q2 transistors change from a cut-off state to a conduction state.

In particular, the first transistor Q1 will enable, within the first power circuit portion 2, the protection means (not shown) arranged to prevent destruction of the electronic circuit 1.

The second transistor Q2 will then open the controlled switch M1 to disconnect the second signal circuit portion 3 from the supply voltage Vcc.

To summarize, in view of the structural complexity of the signal circuit portion incorporated in a semiconductor electronic circuit being a factor of growing importance, a protection device against overvoltages in the voltage supply as described hereinabove becomes quite convenient to use.

It should not be overlooked, moreover, that a semiconductor electronic circuit constructed in accordance with the invention would draw no additional quiescent current, which makes it useful for all applications requiring minimal quiescent current draw.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A semiconductor circuit with a protection device for protecting against a supply voltage overload, comprising:

a voltage sensing circuit including a first resistor having a first terminal coupled to a supply voltage and a second terminal coupled to an output, a second resistor having a first terminal coupled to the output and a second terminal coupled to a first terminal of a zener diode, and a second terminal of the zener diode coupled to a reference voltage, the voltage sensing circuit operable to sense an overload of the supply voltage and develop an overload signal on the output in response to an overload of the supply voltage;

an electronic circuit including
      a power circuit having a protection circuit coupled to the output of the voltage sensing circuit operable to protect the power circuit in response to the overload signal being active, and
      a signal circuit which is structurally independent from the power circuit; and a switch circuit including, a bipolar transistor having an emitter coupled to the supply voltage, a collector, and a base coupled to the output of the voltage sensing circuit, a MOS transistor having a source coupled to the supply voltage, a drain coupled to the signal circuit, and a gate coupled to the collector of the bipolar transistor, and a resistor coupled between the collector of the bipolar transistor and the reference voltage, the switch circuit operable to couple the supply voltage to the signal circuit when the overload signal is inactive and to isolate the supply voltage from the signal circuit when the overload signal is active.

2. A semiconductor circuit with a protection device for protecting against a supply voltage overload, comprising:

a voltage sensing circuit including a first resistor having a first terminal coupled to a supply voltage and a second terminal coupled to an output, a second resistor having a first terminal coupled to the output and a second terminal coupled to a first terminal of a zener diode, and a second terminal of the zener diode coupled to a reference voltage, the voltage sensing circuit operable to sense an overload of the supply voltage and develop an overload signal on the output in response to an overload of the supply voltage;

an electronic circuit including, a power circuit including a protection circuit having a control terminal coupled to receive a control signal, the protection circuit operable to protect the power circuit when the control signal is active, and a signal circuit which is structurally independent from the power circuit;

a first switch circuit including, a bipolar transistor having an emitter coupled to the supply voltage, a collector, and a base coupled to the output of the voltage sensing circuit, a MOS transistor having a source coupled to the supply voltage, a drain coupled to the signal circuit, and a gate coupled to the collector of the bipolar transistor, and a resistor coupled between the collector of the bipolar transistor and the reference voltage, the first switch circuit operable to couple the supply voltage to the signal circuit when the overload signal is inactive and to isolate the supply voltage from the signal circuit when the overload signal is active; and a second switch circuit including a bipolar transistor having an emitter coupled to the supply voltage, a collector coupled to the control terminal of the protection circuit, and a base coupled to the output of the voltage sensing circuit, the bipolar transistor coupling the control terminal to the supply voltage to drive the control signal active when the overload signal is active.

* * * * *